United States Patent
Martinez et al.

(10) Patent No.: US 9,116,719 B2
(45) Date of Patent: Aug. 25, 2015

(54) PARTIAL COMMITS IN DYNAMIC BINARY TRANSLATION BASED SYSTEMS

(71) Applicants: Raul Martinez, Barcelona (ES); Enric Gibert Codina, Barcelona (ES); Marc Lupon, Barcelona (ES); Kyriakos A. Stavrou, Barcelona (ES)

(72) Inventors: Raul Martinez, Barcelona (ES); Enric Gibert Codina, Barcelona (ES); Marc Lupon, Barcelona (ES); Kyriakos A. Stavrou, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/929,360

(22) Filed: Jun. 27, 2013

(65) Prior Publication Data

US 2015/0007153 A1 Jan. 1, 2015

(51) Int. Cl.
G06F 9/30 (2006.01)
G06F 9/312 (2006.01)
G06F 15/00 (2006.01)
G06F 9/45 (2006.01)
G06F 11/14 (2006.01)

(52) U.S. Cl.
CPC ............ *G06F 8/443* (2013.01); *G06F 11/1412* (2013.01)

(58) Field of Classification Search
None
See application file for complete search history.

(56) References Cited

U.S. PATENT DOCUMENTS

| | | | | |
|---|---|---|---|---|
| 5,974,524 A * | 10/1999 | Cheong et al. | ............. | 712/23 |
| 6,631,514 B1 * | 10/2003 | Le | ............. | 717/137 |
| 7,076,769 B2 * | 7/2006 | Baraz | ............. | 717/136 |
| 2007/0174750 A1 * | 7/2007 | Borin | ............. | 714/732 |
| 2012/0079245 A1 * | 3/2012 | Wang et al. | ............. | 712/208 |
| 2012/0079246 A1 * | 3/2012 | Breternitz et al. | ............. | 712/208 |
| 2013/0311758 A1 * | 11/2013 | Caprioli et al. | ............. | 712/233 |
| 2014/0095832 A1 * | 4/2014 | Haber et al. | ............. | 712/205 |

* cited by examiner

*Primary Examiner* — Don Wong
*Assistant Examiner* — Devayani R Talukdar
(74) *Attorney, Agent, or Firm* — Lowenstein Sandler LLP

(57) ABSTRACT

Described herein are technologies for optimizing computer code. A code generator can optimize a portion of original code to create optimized code. The code generator can create a partial commit point to indicate that execution of the optimized code produces an invalid architectural state. The code generator can create recovery information recover a valid architectural state at a recovery point. The code generator can associate the partial commit point and recovery information with the optimized code.

25 Claims, 12 Drawing Sheets

PARTIAL COMMITS IN DYNAMIC BINARY TRANSLATION BASED SYSTEMS

TECHNICAL FIELD

The present disclosure pertains to the field of computer processing device architecture, and more specifically computer code optimization.

BACKGROUND

In computer engineering, computer code is typically created as source code and then translated to a form that is readable by a target architecture, such as a computer or virtual machine. This translated code can be referred to as machine code. Machine code can be translated in its entirety prior to code execution using a technique called static binary translation. Alternatively, portions of machine code can be translated in blocks and even during runtime using dynamic binary translation. For example, a dynamic binary translator, Just In Time (JIT) compiler or virtual machine can perform dynamic translation and optimization of machine code or bytecode (a type of machine code intended to be recompiled by a JIT), which can be cached for later use. The resulting machine code can target the same architecture as the original code or a different architecture.

DETAILED DESCRIPTION

Figure 1:
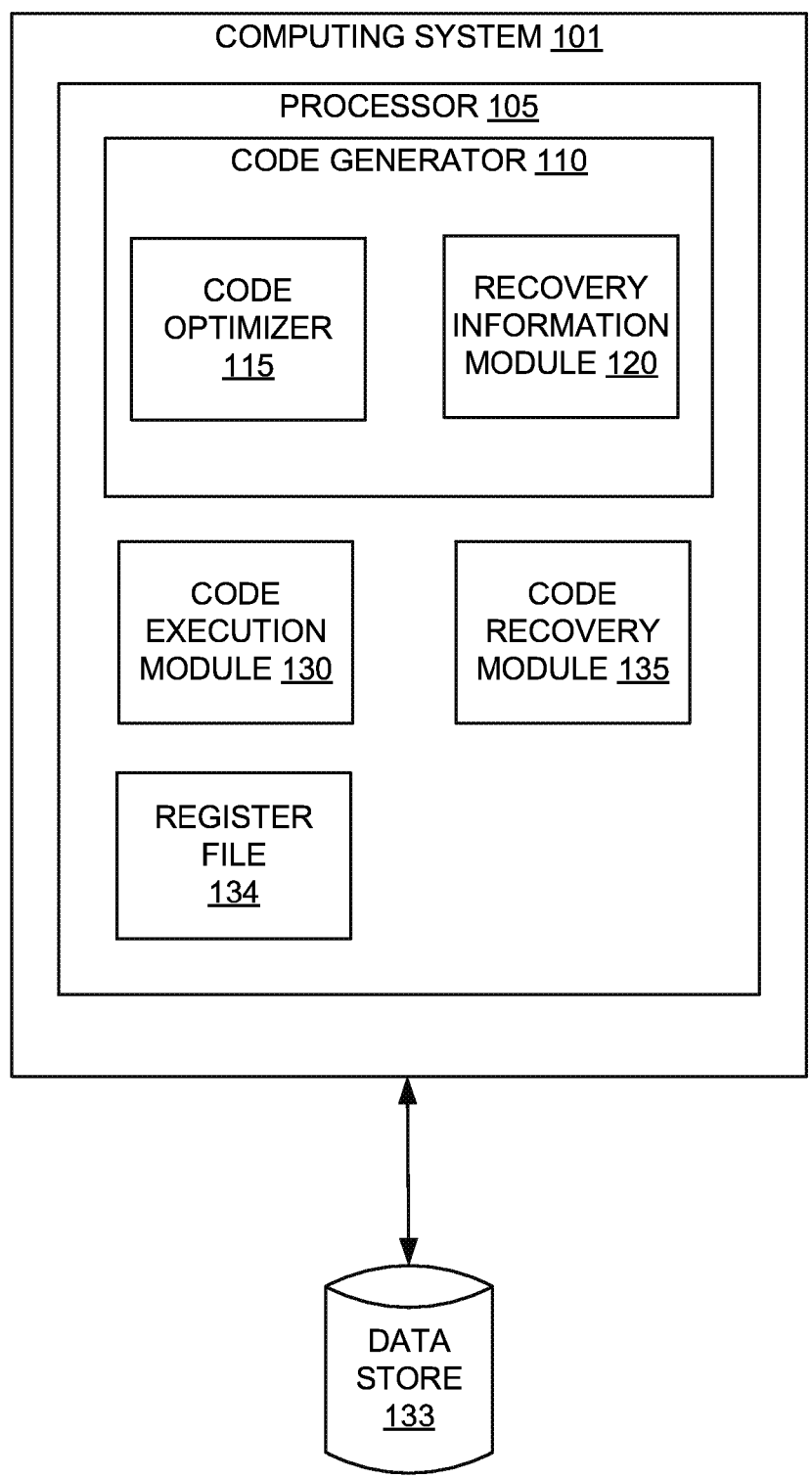
FIG. 1 is a block diagram of an example computing system including a processor and a dynamic compiler according to one implementation.

In the following description, numerous specific details are set forth, such as examples of specific types of processors and system configurations, specific hardware structures, specific architectural and micro architectural details, specific register configurations, specific memory positions, specific instruction types, specific system components, etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic, and other specific operational details of computer system have not been described in detail in order to avoid unnecessarily obscuring the present disclosure.

Systems and methods described herein are directed to code optimization, recovery information generation, and code execution. A code generator (e.g., a processor, compiler, translator, optimizer) can take a piece of original code and generate optimized code. The code generator can be a hardware unit (e.g., a processor) or a software unit executed in a processor. The code generator can be executed by the same processor that is going to execute the optimized code or the code generator can be executed by a different processor. The code generator can dynamically optimize code during code execution. If optimized code is generated during execution, it can be saved in memory for one or more later uses after which it can be discarded. The code generator can also statically generate optimized code while the code is not being executed and store the optimized code in memory for later use by the processor.

During binary translation, the code generator can optimize code during runtime, such as by removing pieces of the original code. For aggressive and/or speculative optimizations, resulting code can be executed as if it were a single operation (e.g., as atomic regions of code). From the architectural state point of view, this means that instructions can be properly executed and their effect can be visible to the rest of the system or none of them are executed. In this sense, in order to be able to aggressively optimize machine code, the code generator can establish commit points in the optimized code along with a recovery mechanism associated with those commits points. Using the commit points, the code generator can specify points along the code in which a snapshot of the relevant state of a machine is taken. The commit points can be specified at any point of an optimized region, such as at the beginning, at an intermediate point, or at the end. The systems and methods can restore the state of the last taken commit point by discarding any modifications to the relevant state of the machine that were generated using the optimized code.

As a processor executes instructions of the optimized code, the processor can compute values that are stored in architectural registers and/or memory positions. The architectural registers and the memory positions comprise an architectural state. Conventional dynamic code compilers can include a dynamic compilation mechanism that can apply transformations (e.g., optimizations) to whole portions of guest code (e.g., a region) while a processor executes the code. Code that is being executed a lot of times can be referred to as hot code. In these conventional systems, code optimizations, for example, could try to remove code that computes value_A for an architectural register. By removing that code, value_A for the architectural register cannot be computed. However, without value_A, the architectural state is partially valid or invalid. While executing other portions of code, the processor may call upon the architectural register for value_A, which is not present. Instead, the architectural register may contain value_B, which can cause an unexpected result (e.g., exception, interruption) or lead to incorrect execution results. To prevent unexpected results, using conventional approaches, the architectural registers and memory positions populated by the execution of optimized code should be the same as if the original code was executed. This is because conventional systems require the architectural state to be valid after the execution of a dynamically compiled portion of code. An architectural state is valid when all of the values in the architectural registers and memory positions are the same as the values that would have been generated by the original code. To ensure that the architectural state is valid, conventional systems place instructions to update the architectural state on all the potential "exits" of the region. When exiting a region, conventional systems use the instructions to update the architectural registers with valid values before executing a different region of code or transitioning from the current region of code to a different one. In this way, the architectural registers are updated to create a valid architectural state. In some instances, architectural register values are computed but never used before being overwritten. Thus, in conventional approaches, resources devoted to maintaining an architectural state may incur significant overhead in terms of power and performance. Conventional approaches might also perform operations that are not necessary to maintain the architecture state or for correct execution of the code.

Disclosed herein is technology for efficiently maintaining the architectural state and for allowing code execution with a partial register architectural state as opposed to existing models that require the full register architectural state for correct execution. The systems and methods described enable selective calculation of values for architectural registers or memory positions, where a valid architectural state is produced when needed. For example, when a value is rarely used, code used to generate the value can be removed. In the event that the value is needed for some operation, the value can be generated. Using the technology described herein, a code generator can generate partial commit points (also referred to as "partial commits") to indicate that one or more registers, or/and one or more memory positions may have invalid values at that commit point. The code generator can also generate recovery code associated with a commit point. The recovery code can include parts of the original code or can be new code that can be used to generate valid values for the registers and/or memory positions.

In any moment, the processor can determine that a valid architectural state needs to be recovered. This determination can be triggered by an unexpected event (e.g., exceptions or interrupts), a given event, or by a check performed by the processor (e.g., when entering a designated or identified code region), each of which can be referred to as a recovery point. For given events, the recovery point can be established by the code generator or by the processor itself. In this instance, the recovery point can be a scheduled or arbitrary point in which the processor can restore the architectural state to that of the last taken commit point. At the recovery point, the processor checks the architectural state. After determining that a valid architectural state needs to be recovered, the processor then detects if the last commit was a partial commit or not. If the last commit point was partial, the recovery process recovers the architectural state at the last commit point which yields a valid architectural state in both memory and registers. This valid architectural state is equivalent to the state that would have been achieved by executing the original code until the last commit point. In other words, the recovery process can recover the architectural state of the last commit point. In addition, for a partial commit point, the processor can use the recovery process to generate a valid architectural state by generating any invalid or missing values of the registers and of the memory positions. The processor can execute recovery code after recovering the state of the partial commit to compute the missing values. The processor can perform a full commit once the architectural state is valid.

By removing computations used to generate rarely or never used values and by providing a mechanism to generate these values when needed, the techniques described herein reduce the overhead for maintaining the architectural state. This is beneficial as it may reduce the computation overhead by not calculating values that are not necessary for the correct execution of a particular application. The systems and methods described herein may increase flexibility and may enable optimizations for reducing the overhead associated with the management of the architectural state, such as on systems that employ dynamic binary translation or static binary translation. Also, static code generators that use atomic regions of code can also take advantage of the systems and methods described herein. Benefits can relate to performance improvement and power savings since a fewer number of instructions are executed to achieve the same end result.

FIG. 1 illustrates a block diagram of an example computing system 101. The computing system 101 may include one or more functional units that execute instructions that cause the computing system to perform any one or more of the methodologies discussed herein. The computing system 101 may be connected (e.g., networked) to other machines in a LAN, an intranet, an extranet, or the Internet. The computing system 101 may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for the computing system 101, the term "machine" shall also be taken to include any collection of machines that individually or jointly execute a set (or multiple sets) of instructions to perform any one or more of the methodologies discussed herein.

In addition to the illustrated components, the computing system 101 may include one or more processors, one or more main memory devices, one or more static memory devices, and one or more data storage device, which communicate with each other via a bus. The processors may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), network processor, or the like. In one embodiment, processor may include one or more processing cores. The processor is configured to execute the processing logic for performing the operations discussed herein. In one embodiment, processor is the same as processing device 105 of FIG. 1 that implements one or more code generators 110 (e.g., compilers, translators, optimizers). The computing system 101 can also include other components as described herein, as well as network interface device, video display units, alphanumeric input devices, cursor control devices, a signal generation device, or other peripheral devices.

In another embodiment, the computing system 101 may include a chipset (not illustrated), which refers to a group of integrated circuits, or chips, that are designed to work with the processing device 105 and controls communications between the processing device 105 and external devices. For example, the chipset may be a set of chips on a motherboard that links the processing device 105 to very high-speed devices, such as far memory and graphic controllers, as well as linking the processing device 105 to lower-speed peripheral buses of peripherals, such as USB, PCI or ISA buses.

The code generator 110 can use a code optimizer 115 to optimize blocks of original code at runtime (i.e., while the processing device executes the code), which is sometimes referred to as dynamic binary translation. In some implementations, the code generator 110 can referred to as a dynamic optimizer or a dynamic code translator. The original code can be in any compiled programming language, such as BASIC, C, C++, Common Lisp, Fortran, Visual Basic, and the like. The code optimizer 115 performs alterations on the original code to produce optimized code. Optimizing code can sometimes be referred to an ability of the code generator to find instructions that can be speculatively altered without affecting future code execution or program data flow. Optimizations can include performing different operations to the original code, such as removing, reordering, moving, combining, and the like. When optimizing, the code optimizer 115 can perform speculative optimizations by analyzing possible outcomes for removing portions of original code. Alternatively, other optimizations may be performed than by removing portions of original code, such as removing non-frequent paths or non-frequent blocks from the execution, reordering memory operations in an aggressive way, speculating a register value or memory position. For each of these optimizations, the code generator 110 can also implement a mechanism to detect that speculation was wrong, then to take appropriate actions to correct what was wrong (e.g., rollback).

The code optimizer 115 can eliminate instructions from the original code that, when executed, would update values of one or more architectural registers of register file 134 or memory positions of data store 133. The code optimizer 115 can identify architectural values that would be computed and overwritten without being used. Such architectural values can be referred to as intermediate values. The code optimizer 115 can eliminate instructions that generate intermediate architectural register or memory position values. In some instances, aggressive code removal optimizations yield code that, when executed, results in a register architectural state that is partially valid. That is, an architecture value of at least one architectural register or memory position may be incorrect, which can be referred to as a partially valid or invalid architectural state. If after executing such optimized code a commit point is established, the commit point will reflect an architectural state that is only partially valid. Code commit points with a partially valid architectural state can be referred to as partial commits. The partial commit instruction itself may be located in a different region of code than the region containing the optimized code that produces the partial architectural state. If the architectural state is made to reflect the state of such a commit (e.g. rollback) the resulting architectural state will be partially invalid. The code generator 110 can provide a mechanism that the computing system 101 can use to identify if the last commit performed was a full or a partial commit.

In an example, the code optimizer 115 can determine that the probability of actually using the values generated by a portion of code is low. At compile time, the code optimizer 115 can remove that portion from the original code. In another example, the code optimizer 115 can measure events in a specific region of code. The frequency of an event can be measured by the number of times that the event occurs after execution of the measured program. After measuring, the code optimizer 115 can determine which portions of code are most frequently executed. For example, ten instructions can account for ninety percent of the instructions executed for a collection of code. The code optimizer 115 can optimize these frequently used instructions to increase performance. In some implementations, the code optimizer 115 can keep the ten instructions and remove the rest of the instructions from the original code. The code optimizer 115 can continue to optimize portions of the code, each time starting the code with a commit point and, if appropriate, marking that the next commit after the execution of the region of code is a partial commit (e.g. marking the end of the optimized code with a partial commit marker).

After applying optimizations to blocks of original code, however, miss-speculations (i.e., incorrect assumptions) can result in unexpected issues, such as exceptions or interruptions that occur while the processing device 105 executes the optimized code. The more aggressive the code optimization, the more likely an unexpected issue may occur during execution.

To handle unexpected issues, the code generator 110 can include a recovery information module 120 that can generate recovery mechanisms (e.g., rollback, recovery instructions, recovery code, etc.) for changing the architectural state to one with correct values in the architectural registers and memory positions. When the code optimizer 115 optimizes original code and creates a partial commit, the recovery information module 120 creates recovery information associated with the partial commit that the processing device 105 can use to recover correct architectural register values in response to the processing device 105 arriving at a recovery point. The recovery point can be an event encountered or identified during or after execution of the partial commit. Events that can trigger a recovery can include an unexpected event (e.g., exception, interruption, or miss-speculation). Such events can be in response to code checking introduced by the code generator or when the processing device 105 enters or exits a code region. Alternatively, the recovery point can be established by the code generator 110 or by the processing device 105.

When executed, the recovery code creates a valid architectural state. The recovery information module 120 can store the recovery code in a data store 133 (e.g., in memory). Once a partial commit has been generated, the code generator 110 can store information on how to locate and execute the recovery code to obtain architectural values for the valid architectural state. If the last commit performed was a full commit, the recovery mechanism typically recovers the last saved state. However, if the last commit was a partial commit, in addition to restoring the last saved state, processing device 105 can take additional actions to recover the value or values of the invalid architectural registers. In the full commit case, the same general recovery mechanism or code (if there is recovery code involved) is typically valid in all cases. However, for the partial commit case, recovery code that is specific to a region of code is used to generate the correct values of the missing architectural registers. In one implementation, the recovery mechanism could be a hardware mechanism that implements the functionality of the recovery information module 120.

The data store 133 can be used to store original code, transformation of original code, optimized code, commits, partial commits, recovery information, recovery code, and recovery instructions. In one implementation, data store 133 is memory. Register file 134 can include one or more registers that store values and variables, such as integer and floating point data operand values that can be used during code execution.

The processing device 105 can execute the partial commit and associated recovery instructions. As illustrated, the processing device 105 includes a code execution module 130 and a code recovery module 135. The code execution module 130 is configured to execute the original and/or optimized code. After detection of a recovery point, the code recovery module 135 can detect whether the code is associated with a partial commit or a full commit. For example, a partial commit indicator created or defined by code optimizer 115 can identify a partial commit for the code execution module 130. The code recovery module 135 can then use the recovery information to revert to a full or valid architectural state as described herein.

As the code optimizer 115 continues to optimize, it may generate a chain of multiple partial commits in a sequence. When generating a chain of multiple partial commits, information recovery of the last partial commit can be used to generate the optimized code of the current region and to create the next partial commit. In one implementation, recovery code of the previous partial commit can be considered part of the original code or the current region of code. In another implementation, code that results in a full commit of the architectural state has been optimized multiple times by the code optimizer 115, resulting in multiple partial commits. Each time the code optimizer 115 generates a partial commit, the code optimizer 115 can inform recovery information module 120 that the commit is partial. The code recovery module 135 can create recovery code (e.g., one or more recovery instructions) for the corresponding partial commit. The code recovery module 135 can also create recovery information for a sequential of partial commits. The recovery code includes instructions to restore to the valid architectural state at the point of the last commit. This restoration may include generating values for registers or memory positions not updated in any of the partial commits of the sequence.

Figure 2:
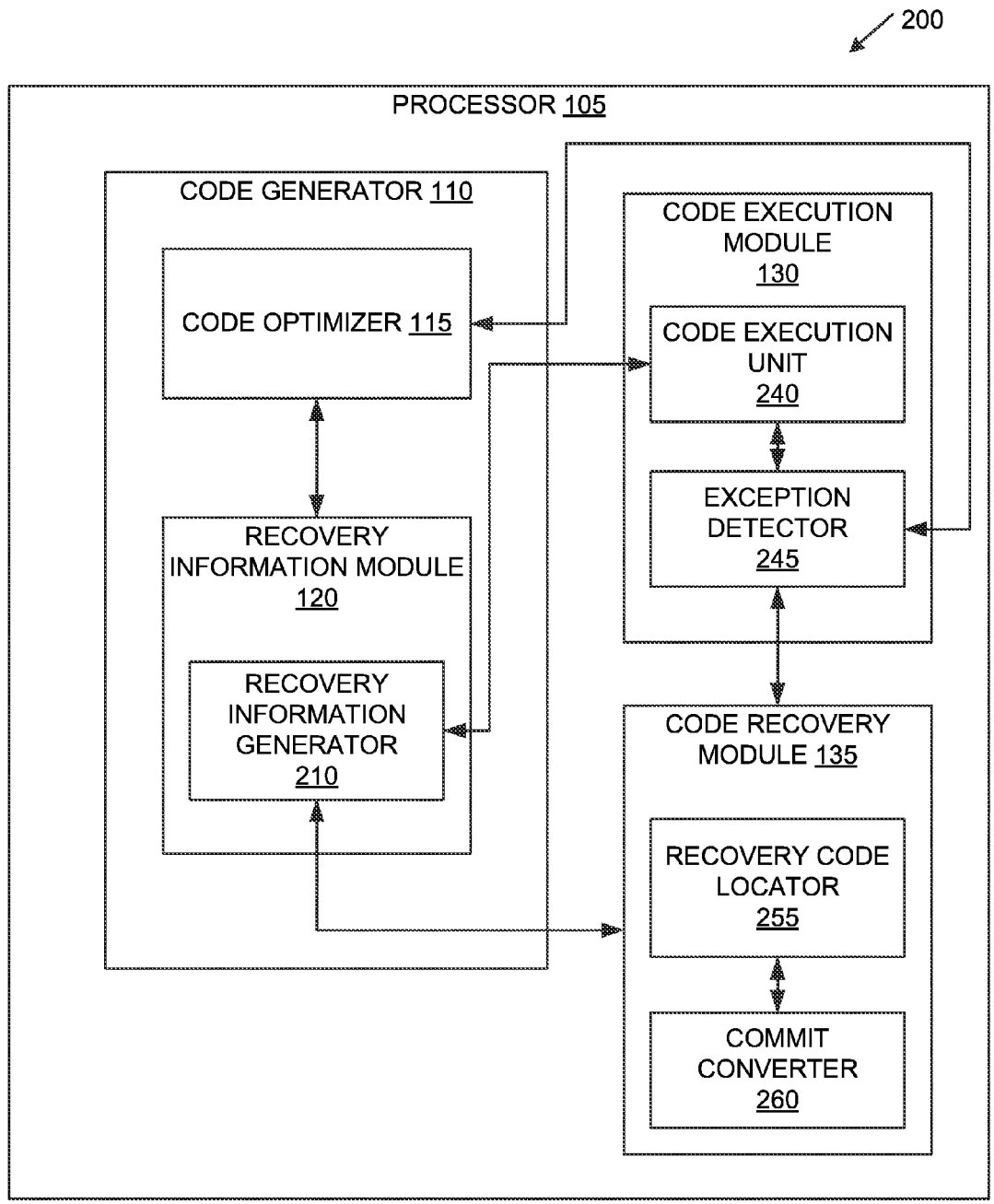
FIG. 2 is a block diagram of another example computing system including a processor and a dynamic compiler according to another implementation.

FIG. 2 illustrates an example system 200 for code optimization and recovery handling in accordance with implementations. The example system 200 includes the processing device 105, code optimizer 115, recovery information module 120, code execution module 130 and code recovery module 135.

As described herein, the code optimizer 115 performs optimizations of original code. When optimizing original code, the code optimizer 115 can specify that the next commit will be a partial commit. The partial commit indicates that at least one architectural register or memory position will not be properly updated and that the resulting commit will be a partial commit.

In some instances, the code optimizer 115 removes code that would have generated an architectural register or memory position value. The recovery information module 120 creates a mechanism for generating recovery code needed to calculate all valid or correct values of an architectural register or memory position. Recovery information module 120 creates recovery information for each partial commit to facilitate obtaining valid architectural values in response to identifying a recovery point, such as an event (e.g., an exception, interruption, or miss-speculation) occurring during or after execution of the partial commit. Recovery information module 120 can include a recovery code generator.

The recovery information generator 210 creates recovery code that includes recovery instructions that can be used to convert a partial commit into a full commit. The recovery code can be code that was previously removed by the code optimizer 115. The recovery code can also be different than the code removed by the code optimizer 115 so long as it produces the correct values when executed. For example, the recovery information generator 210 can perform further optimization on the code removed by the code optimizer 115 by removing, reordering, combining, etc. instructions in the code. In another example, the recovery code can use the state saved by the partial commit as a basis for computing the values of the architectural registers that were not updated during execution of the partial commit. Once the recovery code is generated, the recovery information generator 210 can map the recovery code in memory. The recovery information generator 210 can also update auxiliary structures that can be used to perform the recovery of the architecture state. The recovery information generator 201 can generate an identifier of recovery code of all the optimized code regions that produce a partial architectural state, as described herein. In one implementation, the identifier of the recovery code can include an address of a last taken branch and an address of the associated recovery code can be stored in a table. In other implementations, the optimized code can include an indication that the next commit is to be a partial commit as described herein as well as an address of corresponding recovery code. In further implementations, the address of the recovery code can be embedded within some instruction in the optimized code, instead of in a table. The recovery information generator 210 can generate information to be able to recover the state from any dynamic execution of the code. The optimized code can be executed multiple times and each time the value of the missing register or registers can be different.

The code execution module 130 uses code execution unit 240 to execute code after a full commit (e.g., in a valid architectural state) or after a partial commit (e.g., in an invalid or incomplete architectural state). The code execution unit 240 can execute portions of code (e.g., regions) and can take branches into other parts of the same portion or to other portions. Regions of code can be further divided into blocks of code. Some or all of the regions or blocks can be optimized, as described herein. When executing optimized code, the code execution unit 240 can execute through partial state branches. A partial state branch is a branch that finishes a piece of code where some computation to update the value of the architectural registers has been skipped. The commit that follows this branch is a partial commit. During execution of the code in optimized regions or during the transition between two regions of code, the code execution module 130 can identify or encounter a recovery point. For example, when executing code, unforeseen issues may arise, such as exceptions or interruptions. With some exceptions or interruptions, a recovery mechanism is required to discard all the modifications or optimizations performed after the last commit, partial or not. The exception detector 245 can identify a recovery point and can communicate with the code recovery module 135 to perform a recovery or rollback.

The code recovery module 135 can receive information related to a recovery point from the code execution module 130 and can handle any necessary code or architectural state recovery. The code recovery module 135 can include a recovery code locator 255 and a commit converter 260.

The recovery code locator 255 can determine whether the recovery point is associated with a partial commit. If the recovery point is associated with a partial commit, the commit converter 260 can use the recovery information to compute the values of the architectural registers that were not updated before the partial state branch. To determine whether the last commit was partial, the recovery code locator 255 can employ several alternatives. In some implementations, the address of the last taken branch executed by the code execution unit 240 can be stored in data store 133 or in an internal register. When the recovery code locator 255 checks whether the previous commit was partial or full, it can access a table generated by the recovery information module 120. Given the address of the last taken branch, the table can be used to identify the commit type (e.g., full or partial) and if partial, the location of the corresponding recovery code of the last executed commit. In other implementations, the code itself includes an indication whether the next commit is to be a partial commit or a full commit. The code execution module 130 can store the partial commit of the last taken branch. When the recovery code locator 255 checks whether the previous commit is partial or full, it can access a software table using the last branch of the partial commit. The table can employ a hash technique, for example, to accelerate its access time. The table allows determining whether the branch was followed by a partial commit instruction and if so, the location of the corresponding recovery code.

In other implementations, for identifying recovery information or recovery code, the processing device 105 can execute a special branch instruction that records the status of the next commit in a special register. In particular, the processing device 105 stores a value indicating whether the next commit is partial in both a next_commit_is_partial special register and the address of the branch in a last_partial_state_branch special register. For subsequent commits, the value in the next_commit_is_partial special register is copied to the last_commit_is_partial special register and then the next_commit_is_partial special register is unset. When creating subsequent commits, the value in last_partial_state_branch can be preserved such that it can be recovered in case of a rollback. To determine whether the previous commit was a partial commit, the recovery code locator 255 can check the value in the last_commit_is_partial special register. If the last_commit_is_partial special register was set previously, then the commit that followed the last branch was a partial commit. The recovery code locator 255 can access a table, as similarly described above, to determine the location of the recovery code using the partial commit identified by the value in the last_partial_state_branch special register.

In further implementations, for locating or identifying recovery information or recovery code, the processing device 105 can use a special instruction to indicate that the next commit will be a partial commit (similar to the branch instruction described above). The special instruction can also indicate the location (e.g., directly or by providing the location in relation to an address stored in a special register) of the associated recovery code. This implementation makes possible to specify a partial commit without having a partial state branch at the end of the optimized code.

The commit converter 260 recovers a partial commit into a full commit. To perform the code recovery, the commit converter 260 can use the recovery information generated by the recovery information module 120 to restore the architectural state to a fully valid state. The commit converter 260, for example, can use the recovery information to identify an address or location of the recovery code. After the address or location of the recovery code has been identified, the commit converter 260 can execute the code to recover the valid architectural state. In another implementation, the commit converter 260 can transmit the recovery code to the code execution unit 240, which executes the recovery code to recover the valid architectural state. Once the architectural state has been recovered and is fully valid, an event handler for the unexpected event can be invoked. An example process flow for recovering a fully valid architectural state is described in conjunction with FIG. 5.

Figure 3:
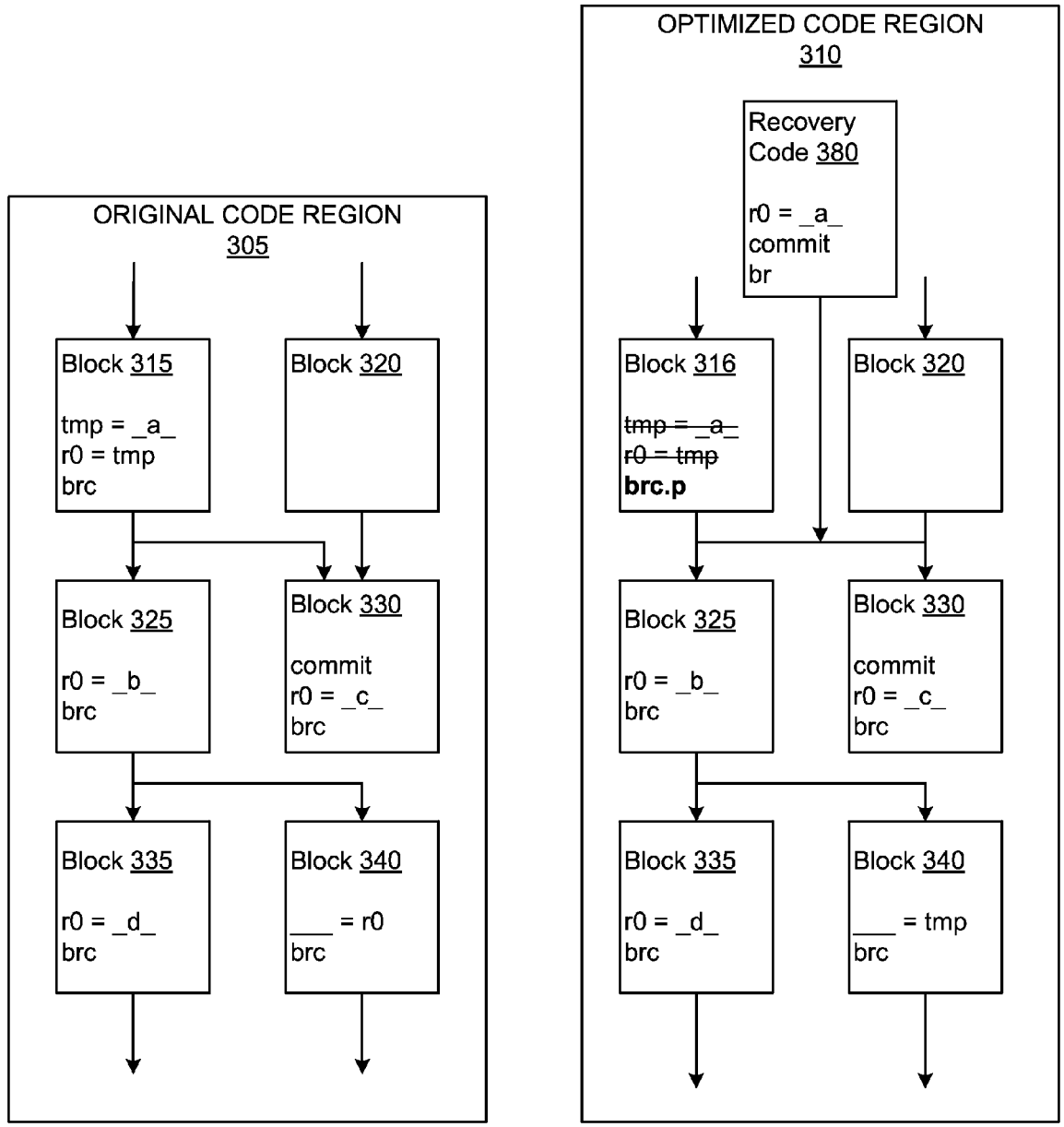
FIG. 3 is an example of code optimization according to some implementations.

FIG. 3 illustrates an example of optimizing original code region 305 to create optimized code region 310, which can be performed by the code generator 110. Original code region 305 and optimized code region 310 both include one or more code blocks. Within the code blocks, r0 represents an architectural register, tmp a micro-architectural temporal register, and _a_ ... _d_ represent a computation to produce a value. In block 315, r0 is written with a value that is overwritten independently of the path that is taken (both in block 325 and block 330). Since this value r0 is replaced regardless of which subsequent code block, instructions for generating the intermediate r0 value in block 315 can be removed.

When optimizing block 315, the instructions for generating intermediate r0 value can be removed, as shown in block 316 of the optimized code region 310. The branch from block 316 to block 325 becomes a partial state branch. A commit on block 330 would behave as a partial commit when the execution comes from optimized block 316 but as a full commit when it comes from block 320. In one implementation, block 316 can be identified as producing a partial architectural state by explicitly tagging the branch, shown as 'brc.p'. To illustrate an example of code that is not removed during optimization, an instruction that writes r0 in block 335 is not removed because its value is used in block 440 as "_=r0".

During code optimization, a code generator can generate recovery code 380 and store it with the optimized code of the region or in another location. When the recovery code 380 is stored apart from the optimized code the code generator can include instructions for obtaining the recovery code 380 within the optimized code. For example, the code generator 110 can create or update a table that contains the address of the location of the recovery code 380. The location can be indexed in relation to the optimized code region 310.

After optimization, however, code blocks may need values that were not computed because the code that would have computed the values was removed during optimization. The recovery code 380 can be executed to restore the architectural state that is needed. For example, during an optimization, instructions that generate r0 in block 325 were removed. When region 340 is executed, an exception or interruption may occur that requires the full valid architectural state for proper execution. The exception or interruption may not be related to a missing value. Use of an incorrect value does not necessarily result in an exception; an application that uses an incorrect value can just produce an incorrect output. In one implementation, the code generator 110 can receive an indication that a missing register is used. In this implementation, the code generator 110 can decide to re-optimize the code without generating a partial commit. In some implementations, if the code generator 110 receives an indication that the use of a missing value will result in an exception, then a recovery point can be associated with the exception. Using the recovery code 380, a processor can generate the r0 value of block 325 so code execution in region 340 can continue.

Figure 4:
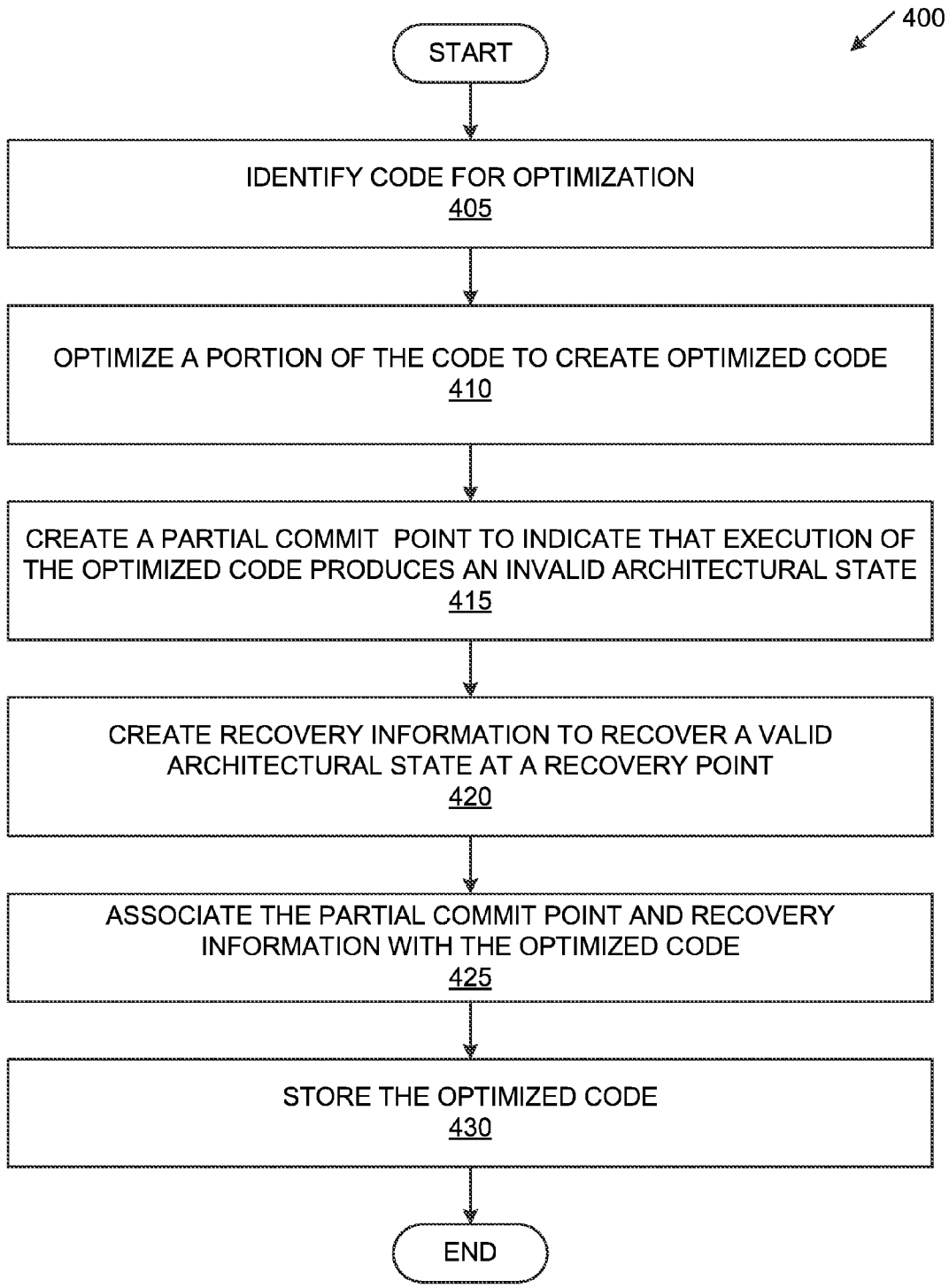
FIG. 4 is a flow diagram of a method for optimizing code and for creating code recovery information according to some implementations.

FIG. 4 is a flow diagram illustrating a method 400 of optimizing code according to one implementation. Method 400 may be performed by processing logic that may comprise hardware, software, firmware or a combination thereof. In one embodiment, method 400 is performed by a code generator, such as code generator 110, as described herein.

Referring to FIG. 4, the method 400 begins when processing logic identifies original code for optimization at block 405.

At block 410, processing logic optimizes a portion of the original code to create optimized code. When optimizing the original code, processing logic can remove one or more instructions from the original code. In further implementations, processing logic can combine multiple instructions in the original code into on instruction. In yet another implementation, processing logic identifies a region of code associated with the optimized code. Processing logic can profile the identified region of the optimized code to determine a use characteristic of the identified region of optimized code. The use characteristic of the identified region of optimized code can include at least one of: an execution frequency for a piece of code (e.g., a number of times the identified region of optimized code is executed over a period of time), a value generated by executing the identified region of optimized code, or a comparison of the identified region of optimized code with another region of code. Based on this profiling information, the processing logic can decide what optimization to apply for each piece of code and how to apply them.

At block 415, processing logic creates a partial commit point to indicate that execution of the optimized code produces an invalid architectural state. The partial commit can indicate that at least one of a plurality of registers or memory positions may include an incorrect value. Optimized code can include a set of code regions, each of which can include at least one entry point and at least one exit point. When optimizing, processing logic can optimize code of the set of code regions and to create at least one new partial commit point for the set of code regions. In another implementation, processing logic can associate the partial commit point with an exit point of the set of code regions.

At block 420, processing logic creates recovery information to recover a valid architectural state (e.g., register and/or memory position values) at a recovery point. A processor can encounter or identify the recovery point after execution of the partial commit. The recovery point can be, for example, an unexpected event (e.g., exception, interruption) or can be a point generated by the processing logic. In one implementation, the recovery information facilitates recovering a correct value for the at least one of the plurality of registers in response to encountering, identifying or detecting an unexpected event after execution of the optimized code. The recovery information can include recovery code stored in memory. In another implementation, the recovery information includes an address for locating the recovery code in the memory. In yet another implementation, the recovery information can include an instruction to store a representation of the partial commit point in a register.

At block 425, processing logic associates the partial commit point and recovery information with the optimized code and at block 430, processing logic stores the optimized code to memory.

Figure 5:
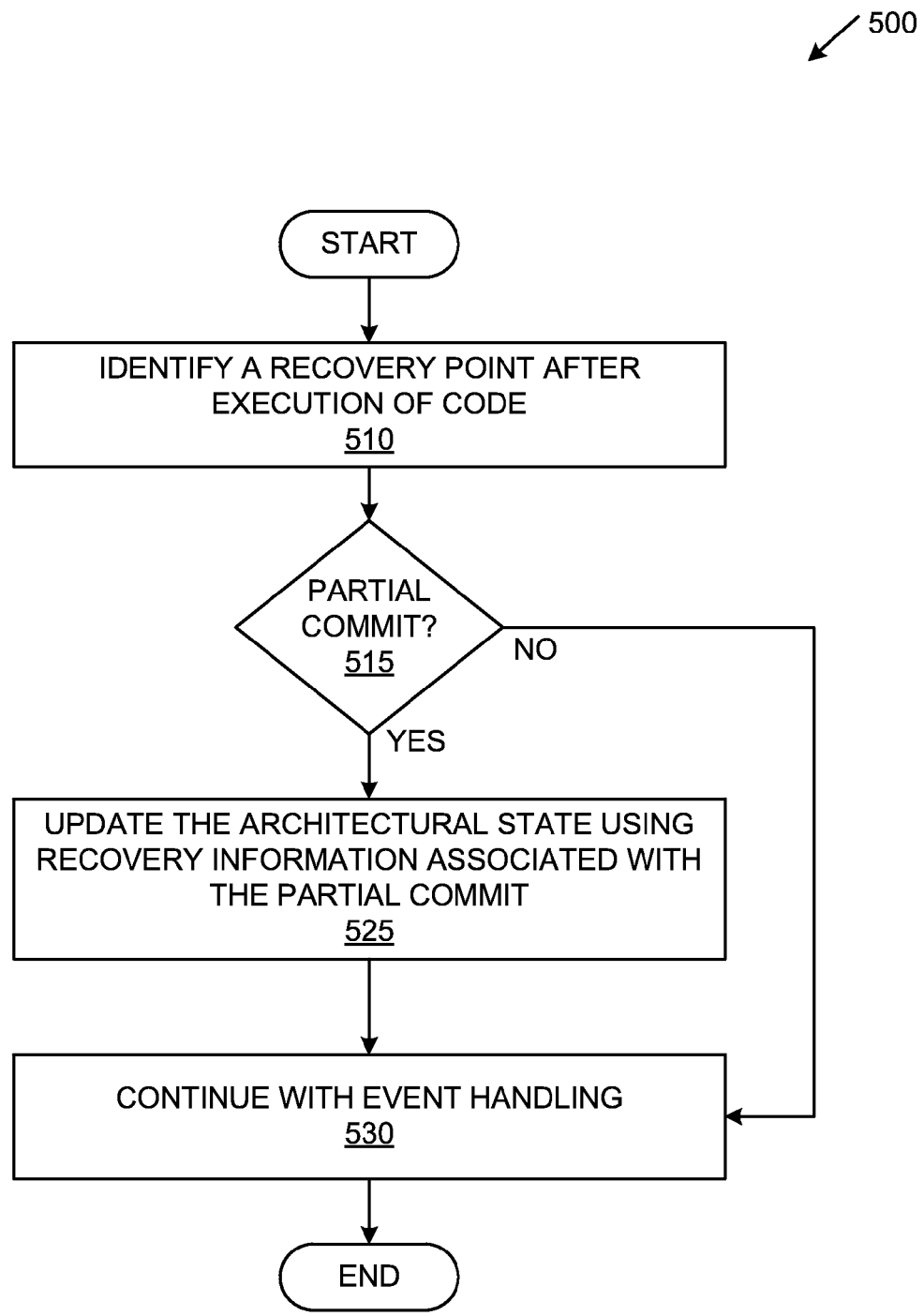
FIG. 5 is a flow diagram of a method for using recovery information to generate an architectural state according to some implementations.

FIG. 5 is a flow diagram illustrating a method 500 of recovering an architectural state according to one implementation. Method 500 may be performed by processing logic that may comprise hardware, software, firmware or a combination thereof. In one embodiment, method 500 is performed by a processing device 105, as described herein.

Referring to FIG. 5, the method 500 begins at block 510 when processing logic identifies or encounters a recovery point, such as an unexpected event (e.g., interrupt, exception) during or after execution of the code (e.g., optimized or not). The code can be associated with a commit. The commit can be associated with an architectural state in which at least one of a plurality of registers or memory positions includes an invalid architectural state. In this case, the commit is a partial commit. The unexpected event can be detected while executing code within a region, when exiting a region or when moving between different regions.

At block 515, processing logic determines whether the optimized code is associated with a partial commit. If the optimized code is not associated with a partial commit, processing logic can continue with normal event handling at block 530, which can include the recovery of a full architectural state from the last full commit. If the optimized code is associated with a partial commit, processing logic proceeds to block 525.

At block 525, processing logic updates the architectural state using recovery information associated with the partial commit point. The recovery process can include the restoration of the architectural state to the values of the last partial commit. When updating the architectural state, processing logic can obtain or calculate at least one valid architectural register value or memory position to replace at least one invalid architectural register or memory position value using the recovery information. Processing logic can obtain the at least one valid architectural register value by executing recovery code that was generated during code optimization. The recovery code can perform a full commit at this point. Once the correct architectural values are generated, the architectural state is valid and at block 530, processing logic continues with normal unexpected event handling.

Figure 6A:
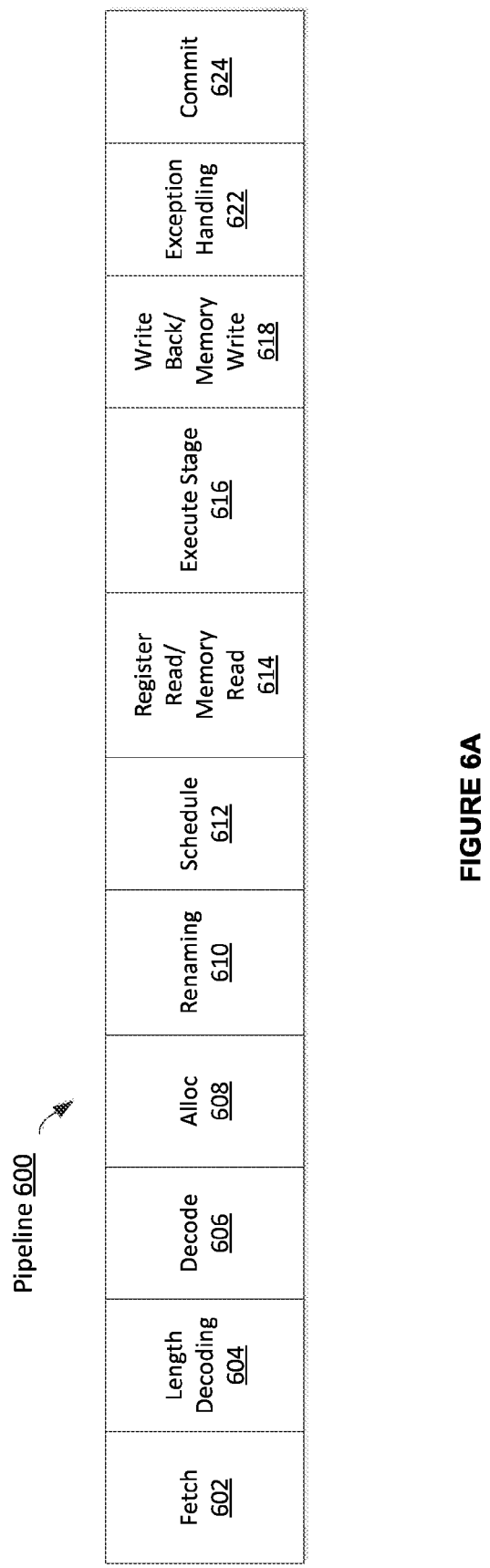
FIG. 6A is a block diagram illustrating an in-order pipeline and a register renaming stage, out-of-order issue/execution pipeline implemented according to at least one implementation of the disclosure.

FIG. 6A is a block diagram illustrating a micro-architecture for a processor 600 that implements code execution and can implement code optimization and recovery information generation in accordance with one embodiment of the disclosure. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 660. The decode unit 660 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 660 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 660 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefeteching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6B:
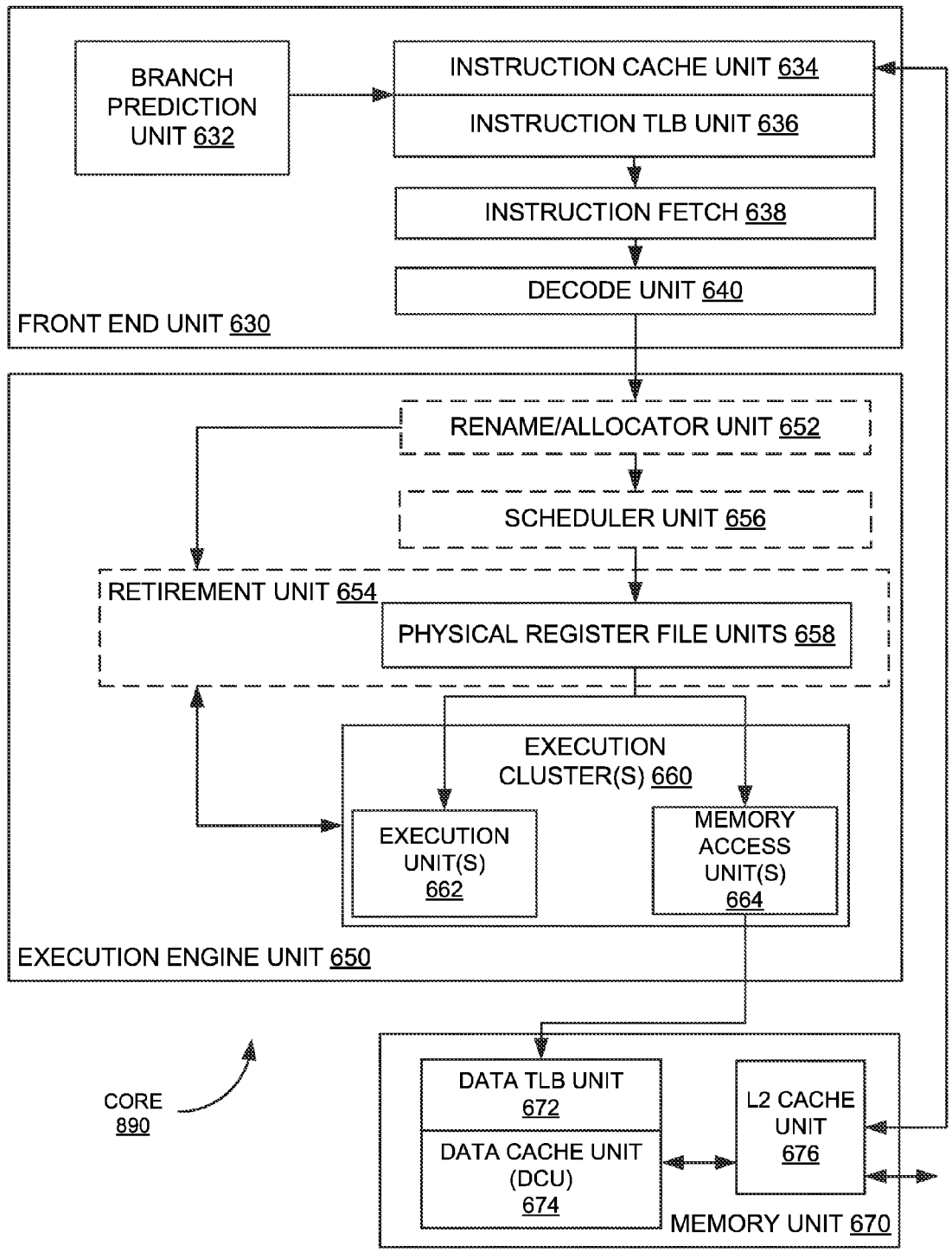
FIG. 6B is a block diagram illustrating a micro-architecture for a processor that implements code optimization, recovery information generation and code execution in which one implementations of the disclosure may be used.

FIG. 6B is a block diagram illustrating an in-order pipeline and a register renaming stage, out-of-order issue/execution pipeline implemented by processing device 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
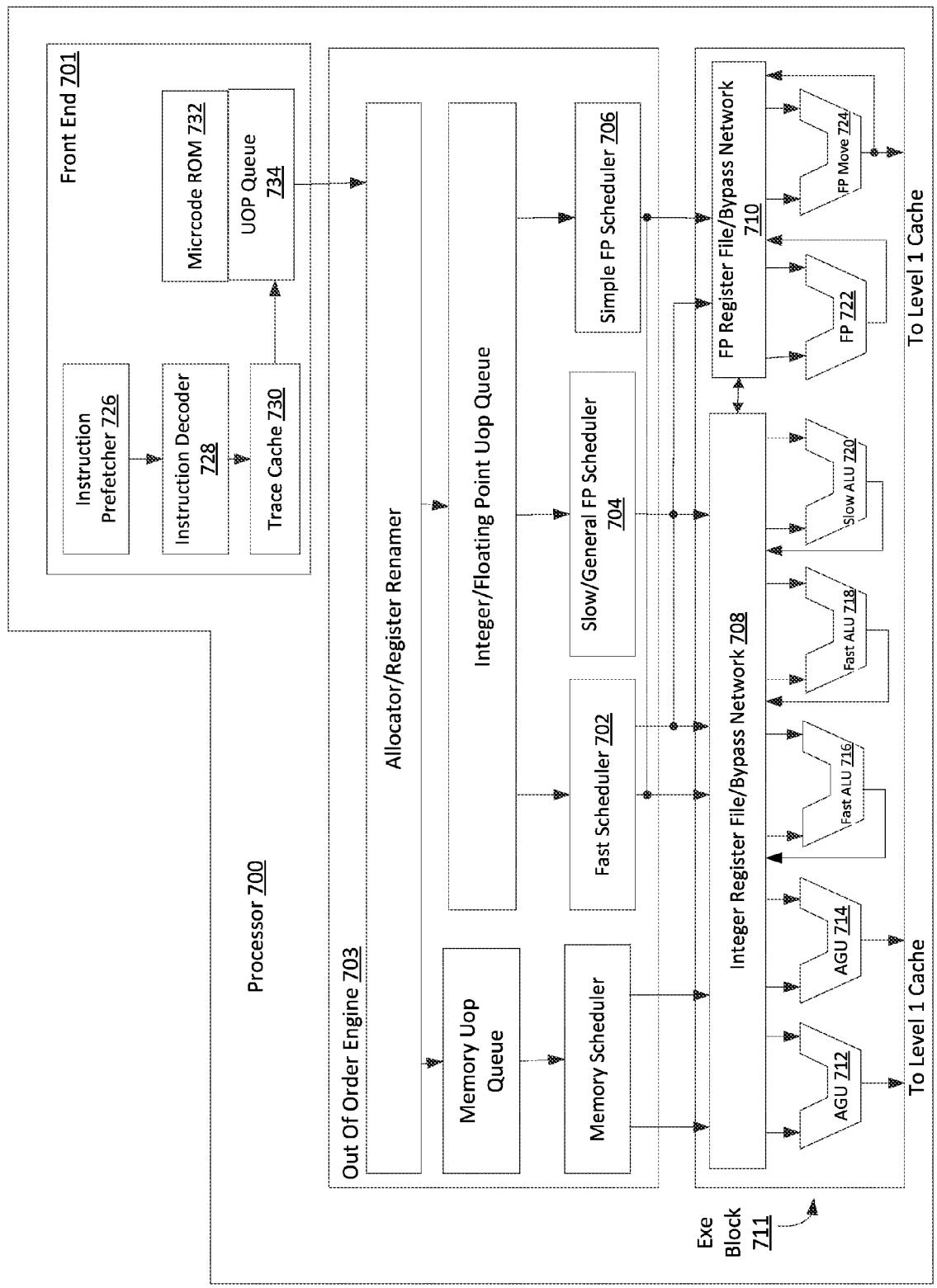
FIG. 7 illustrates a block diagram of the micro-architecture for a processor that includes logic circuits to perform code optimization, recovery information generation and code execution in accordance with one implementation of the disclosure.

FIG. 7 illustrates a block diagram of the micro-architecture for a processor 700 that includes logic circuits to perform code optimization, recovery information generation and code execution in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 710, 712, 714 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 710, 712, 714, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 710, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 710, are described in the context of performing integer operations on 64 bit data operands. In alternative embodiments, the ALUs 716, 718, 710, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement code optimization, recovery information generation and code execution according to embodiments of the disclosure. In one embodiment, the execution block 711 of processor 700 may include code generator 110, to perform code optimization according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
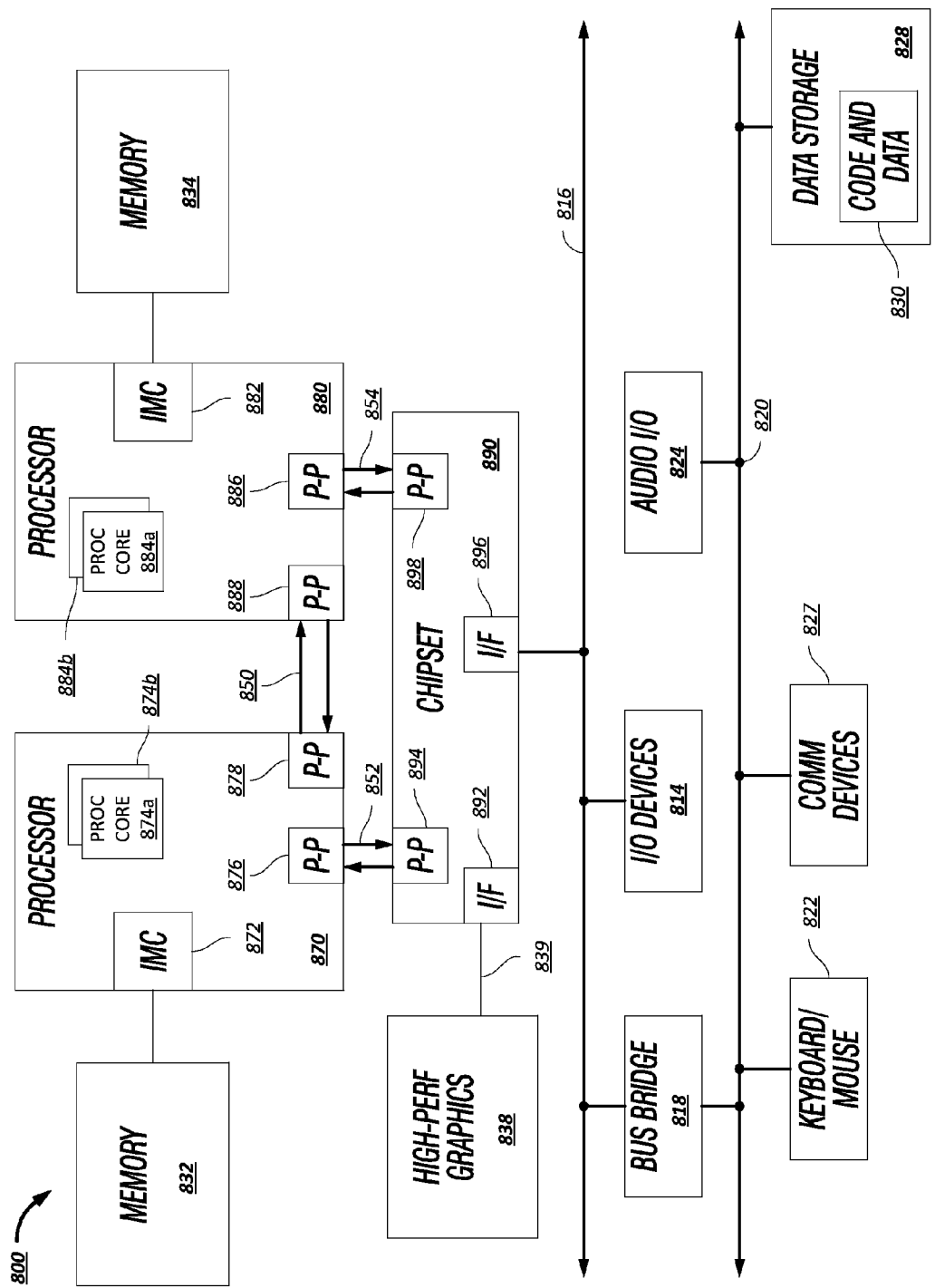
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

The embodiments are described with reference to code optimization, recovery information generation and code execution in specific integrated circuits, such as in computing platforms or microprocessors. The embodiments may also be applicable to other types of integrated circuits and programmable logic devices. For example, the disclosed embodiments are not limited to server computer systems, desktop computer systems or portable computers, such as the Intel® Ultrabooks™ computers, and may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments are described with reference to a processing device, other embodiments are applicable to other types of integrated circuits and logic devices. Similar techniques and teachings of embodiments of the present disclosure can be applied to other types of circuits or semiconductor devices that can benefit from code optimization, recovery information generation and code execution, higher pipeline throughput and improved performance. The teachings of embodiments of the present disclosure are applicable to any processing device or machine that performs data manipulations. However, the present disclosure is not limited to processing devices or machines that perform 512 bit, 256 bit, 128 bit, 64 bit, 32 bit, or 16 bit data operations and can be applied to any processing device and machine in which manipulation or management of data is performed. In addition, the description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processing device that is programmed with the instructions to perform the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Figure 9:
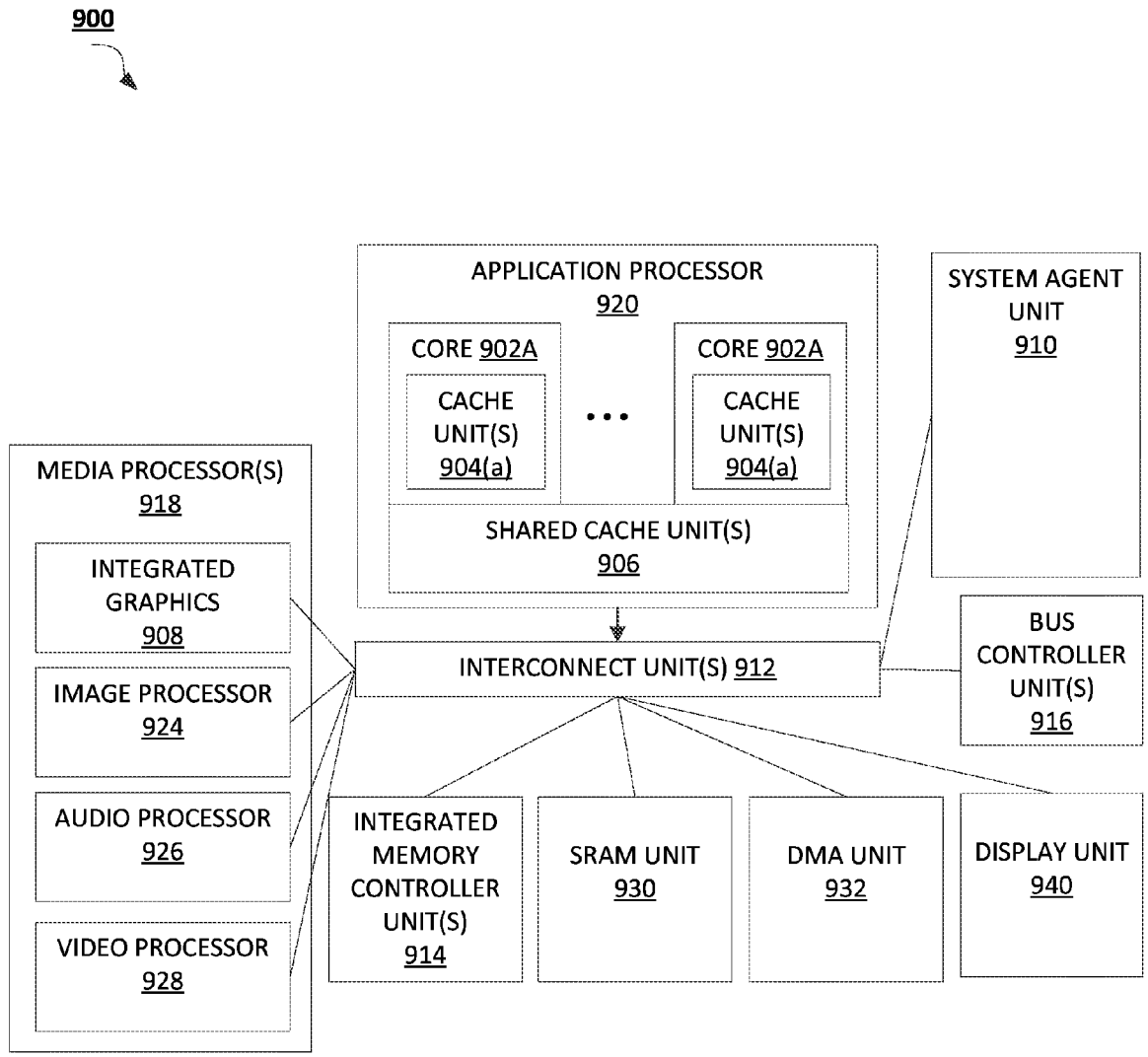
FIG. 9 is a block diagram of a system-on-a-chip according to one implementation.

FIG. 9 is an exemplary system on a chip (SoC) that may include one or more of the cores 902. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a SoC 900 in accordance with an embodiment of the present disclosure. Similar elements in FIG. 5 bear like reference numerals. Also, dashed lined boxes are features on more advanced SoCs. In FIG. 9, an interconnect unit(s) 902 is coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays.

Figure 10:
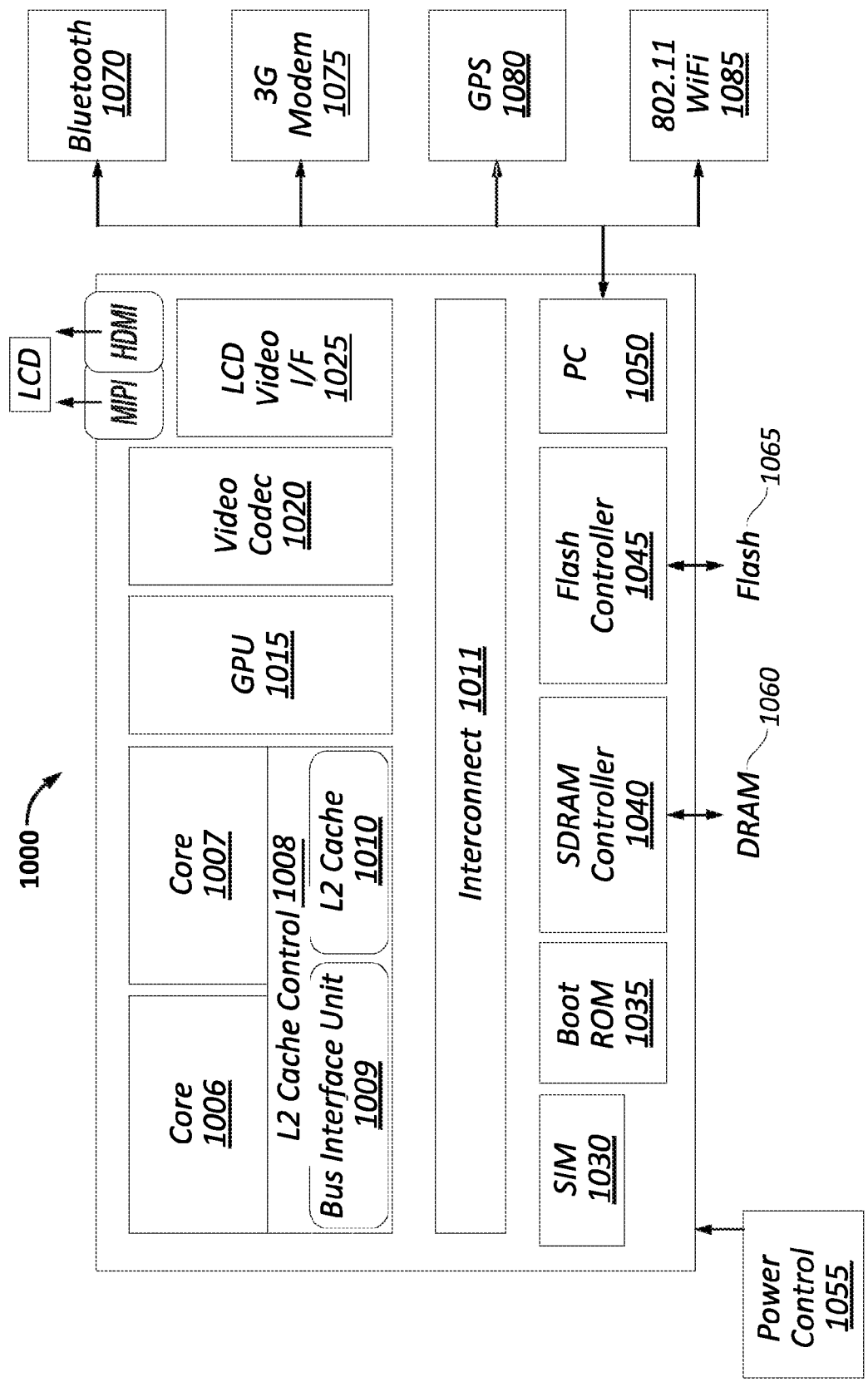
FIG. 10 illustrates another implementation of a block diagram for a computing system.

Turning next to FIG. 10, an embodiment of a system on-chip (SOC) design in accordance with embodiments of the disclosure is depicted. As an illustrative example, SOC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SOC 1000 includes 2 cores—1006 and 1007. Similar to the discussion above, cores 1006 and 1007 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1011 includes an on-chip interconnect, such as an IOSF, AMBA, or other interconnects discussed above, which can implement one or more aspects of the described disclosure.

Interconnect 1011 provides communication channels to the other components, such as a Subscriber Identity Module (SIM) 1030 to interface with a SIM card, a boot rom 1035 to hold boot code for execution by cores 1006 and 1007 to initialize and boot SOC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the embodiments described herein.

In addition, the system illustrates peripherals for communication, such as a Bluetooth module 1070, 3G modem 1075, GPS 1080, and WiFi 1085. Note as stated above, a UE includes a radio for communication. As a result, these peripheral communication modules may not all be included. However, in a UE some form of a radio for external communication should be included.

Figure 11:
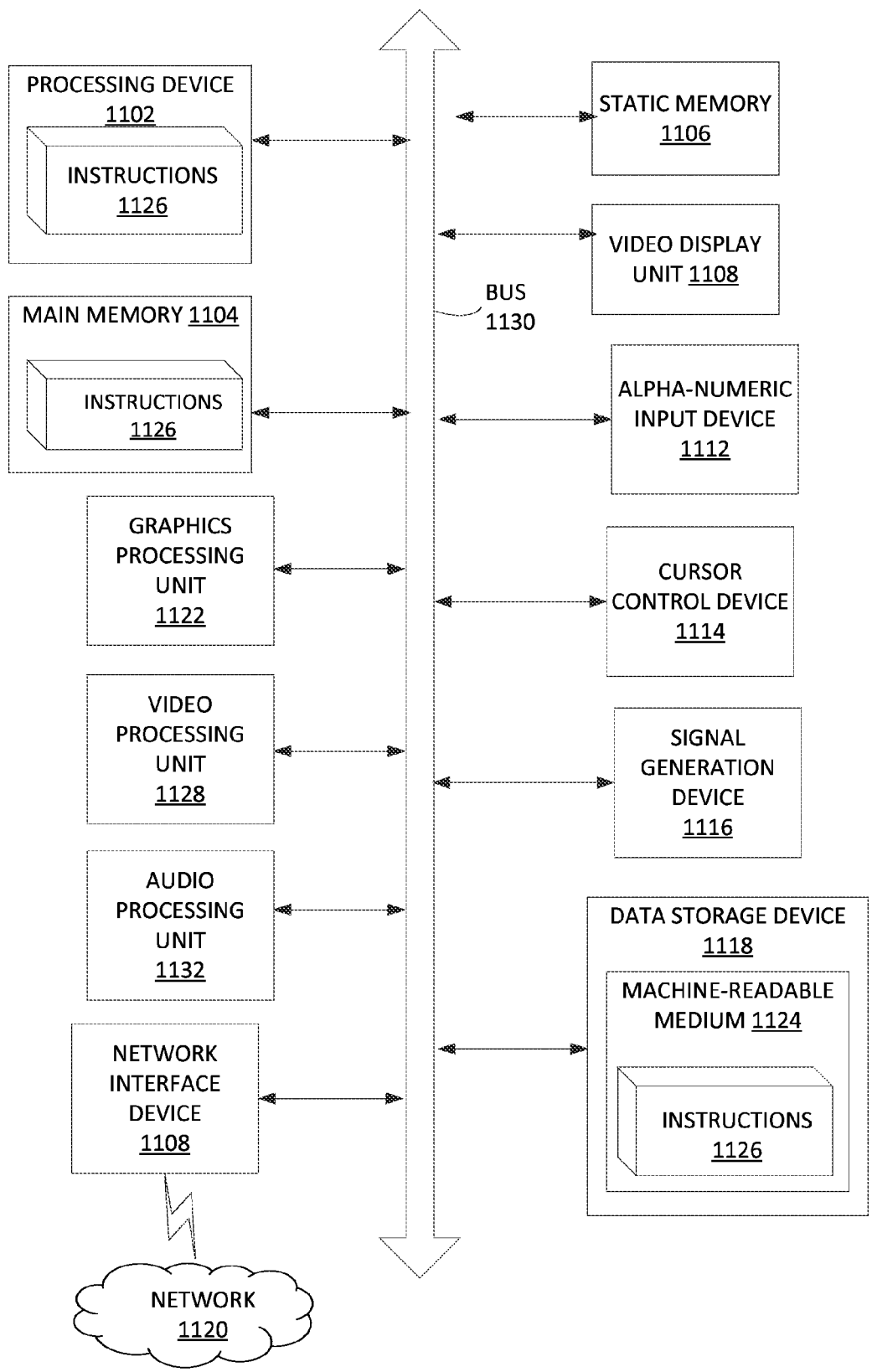
FIG. 11 illustrates another implementation of a block diagram for a computing system.

FIG. 11 illustrates a diagrammatic representation of a machine in the example form of a computing system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet.

The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1100 includes a processing device 1102, main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processing cores. The processing device 1102 is configured to execute the processing logic 1126 for performing the operations discussed herein. In one embodiment, processing device 1102 can be part of the computing system 101 of FIG. 1. Alternatively, the computing system 1100 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1100 may further include a network interface device 1108 communicably coupled to a network 1120. The computing system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a signal generation device 1116 (e.g., a speaker), or other peripheral devices. Furthermore, computing system 1100 may include a graphics processing unit 1122, a video processing unit 1128 and an audio processing unit 1132. In another embodiment, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1118 may include a computer-readable storage medium 1124 on which is stored software 1126 embodying any one or more of the methodologies of functions described herein. The software 1126 may also reside, completely or at least partially, within the main memory 1104 as instructions 1126 and/or within the processing device 1102 as processing logic 1126 during execution thereof by the computing system 1100; the main memory 1104 and the processing device 1102 also constituting computer-readable storage media.

The computer-readable storage medium 1124 may also be used to store instructions 1126 utilizing the processing device 105, such as described with respect to FIG. 1, and/or a software library containing methods that call the above applications. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an apparatus, including a memory to store original code and optimized code, and a processor coupled to the memory, where the processor is configured to execute a code generator, wherein the code generator is configured to optimize a portion of the original code to create optimized code, create a partial commit point to indicate that execution of the optimized code produces an invalid architectural state, create recovery information to recover a valid architectural state at a recovery point, and associate the partial commit point and recovery information with the optimized code.

In Example 2, the subject matter of Example 1, where the optimized code is executed in a processor that comprises a register file comprising a plurality of registers, where the invalid architectural state includes an incorrect value in one or more of the plurality of registers or a plurality of memory positions, where the recovery information includes recovery code that, when executed, are configured to recover at least one correct value for the at least one of the plurality of registers or the plurality of memory positions in response to the recovery point.

In Example 3, the optimized code of any one of Examples 1-2 where when the code generator optimizes the portion of the original code, the code generator to perform at least one of remove one or more instructions in the original code, combine a plurality of instructions in the original code into one instruction, or apply an optimization that leads to an invalid architectural state.

In Example 4, the optimized code of any one of Examples 1-3 can optionally include a plurality of code regions, each of which includes at least one entry point and at least one exit point, where the code generator is further configured to optimize code of at least one of the plurality of code regions and to create at least one partial commit point for the at least one of the plurality of code regions, where the code generator is further configured to associate the partial commit point with an exit point of the at least one of the plurality of code regions.

In Example 5, the subject matter of any one of Examples 1-4, where the code generator is further configured to store the recovery information in the memory.

In Example 6, the subject matter of any one of Examples 1-5, where the recovery information includes a partial commit marker and recovery code, where the partial commit marker to identify a next partial commit, where at least one of the processor or a second processor is to execute the recovery code to recover a correct value for the valid architecture state.

In Example 7, the subject matter of any one of Examples 1-6, where the recovery information includes an address to locate the recovery code.

In Example 8, the subject matter of any one of Examples 1-7, where the recovery point is associated with at least one of an interrupt or an exception.

In Example 9, the subject matter of any one of Examples 1-8, where one of the processor or a second processor is further configured to execute the optimized code, detect the recovery point after execution of the optimized code, and using the recovery information, obtain at least one correct value for the at least one of the plurality of registers that include an incorrect value.

In Example 10, the subject matter of any one of Examples 1-9, where the code generator is further configured to identify a region of the optimized code, and profile the identified region of the optimized code to determine a use characteristic of the identified region of the optimized code.

In Example 11, the subject matter of any one of Examples 1-10, where the use characteristic of the identified region of code includes at least one of: a number of times the identified region of optimized code is executed over a period of time, a value generated by executing the identified region of optimized code, or a comparison of the identified region of optimized code with another region of optimized code identified by the processor.

In Example 12, the subject matter of any one of Examples 1-11, where the code generator is to speculatively optimize the original code based on the use characteristic.

Example 13 is an apparatus, including a memory to store code, and a processor coupled to the memory, where the processor includes a register file including a plurality of registers, where the processor is configured to identify a recovery point after execution of the code, where the code is associated with a partial commit point, the partial commit point to indicate an invalid architectural state, and update the architectural state using recovery information associated with the partial commit point.

In Example 14, the subject matter of Example 13, where the memory includes a plurality of memory positions, where the invalid architectural state includes an incorrect value in one or more of the plurality of registers or the plurality of memory positions, where the recovery information includes recovery code that, when executed, is to recover at least one correct value for the at least one of the plurality of registers or the plurality of memory positions in response to the recovery point.

In Example 15, the subject matter of any one of Examples 13-14, where the memory is configured to store the recovery information.

In Example 16, the subject matter of any one of Examples 13-15, where the recovery information comprises recovery code that causes the processor to generate a valid value to update the architectural state.

In Example 17, the subject matter of any one of Examples 13-16, where when identifying the recovery point, the processor is configured to identify whether a commit point was partial commit point, and identify the recovery information when the commit point is a partial commit point.

In Example 18, the subject matter of any one of Examples 13-17, where when updating the architectural state using recovery information associated with the partial commit point, the processor is to identify, using the recovery information, additional code that is not part of an optimized portion of the code, execute the identified region of code to generate a correct value for at least one of the plurality of registers, and write the correct value to the least one of the plurality of registers.

Example 19 is a method, including identifying original code for optimization, optimizing a portion of the original code to create optimized code, creating a partial commit point to indicate that execution of the optimized code produces an invalid architectural state, creating recovery information to recover a valid architectural state at a recovery point, and associating the partial commit point and recovery information with the optimized code.

In Example 20, the subject matter of Example 19, where the memory includes a plurality of memory positions, wherein the invalid architectural state includes an incorrect value in one or more of the plurality of registers or the plurality of memory positions, where the recovery information includes recovery code that, when executed, is configured to recover at least one correct value for the at least one of the plurality of registers or the plurality of memory positions in response to the recovery point.

In Example 21, the subject matter of any one of Examples 19-20, where optimizing the portion of the original code includes at least one of removing one or more instructions in the original code, or combining a plurality of instructions in the original code into one instruction.

In Example 22, the subject matter of any of Examples 19-21 can further include storing the recovery information in the memory.

In Example 23, the subject matter of any of Examples 19-22, where the recovery information includes a partial commit marker and recovery code, where the partial commit marker to identify a next partial commit, where executing the recovery code recovers a correct value for the valid architecture state.

In Example 24, the subject matter of any one of Examples 19-23, where the recovery information includes an address to locate the recovery code.

In Example 25, the subject matter of any one of Examples 19-24, where the recovery point includes at least one of an interrupt or an exception.

In Example 26, the subject matter of any one of Examples 19-25 can optionally include detecting the recovery point after execution of the optimized code, and using the recovery information, obtaining at least one correct value for the at least one of the plurality of registers that include an incorrect value.

In Example 27, the subject matter of any one of Examples 19-26 can optionally include identifying a region of the optimized code, and profiling the identified region of the optimized code to determine a use characteristic of the identified region of the optimized code.

In Example 28, the subject matter of any one of Examples 19-27, where the use characteristic of the identified region of code includes at least one of: a number of times the identified region of optimized code is executed over a period of time, a value generated by executing the identified region of optimized code, or a comparison of the identified region of optimized code with another region of optimized code.

In Example 29, the subject matter of any one of Examples 19-28 can optionally include speculatively optimizing the original code based on the use characteristic.

Example 30 is a non-transitory, computer-readable storage medium including instructions that, when executed by a processor, cause the processor to perform the subject matter of any one of the Examples 19 to 29.

Example 31 is an apparatus including means for performing the subject matter of any one of Examples 19 to 29.

Example 32 is a method, including identifying original code for optimization, optimizing a portion of the original code to create optimized code, creating a partial commit point to indicate that execution of the optimized code produces an invalid architectural state, creating recovery information to recover a valid architectural state at a recovery point, and associating the partial commit point and recovery information with the optimized code.

In Example 33, the subject matter of Examples 32 can optionally include detecting the recovery point after execution of the optimized code, and using the recovery information, obtaining at least one correct value for the valid architectural state.

In Example 34, the subject matter of any one of Examples 32-33, where the memory includes a plurality of memory positions, where the invalid architectural state includes an incorrect value in one or more of the plurality of registers or the plurality of memory positions, where the recovery information includes recovery code that, when executed, is configured to recover at least one correct value for the at least one of the plurality of registers or the plurality of memory positions in response to the recovery point.

In Example 35, the subject matter of any one of Examples 32-34, where the memory is configured to store the recovery information.

In Example 36, the subject matter of any one of Examples 32-35, where the memory is configured to store an address for accessing a code region that is part of original code and is not part of an optimized portion of the code.

In Example 37, the subject matter of any one of Examples 32-36, where identifying the recovery point includes identifying whether a commit point was partial commit point, and identifying the recovery information when the commit point is a partial commit point.

In Example 38, the subject matter of any one of Examples 33-37, where obtaining at least one correct value for the valid architectural state includes, using the recovery information, identifying a region of code that is not part of the optimized code, executing the identified region of code to generate a correct value for at least one of a register or a memory position, and writing the correct value to the least one register or memory position.

Example 40 is a non-transitory, computer-readable storage medium including instructions that, when executed by a processor, cause the processor to perform the subject matter of any one of the Examples 32 to 38

Example 41 is an apparatus including means for performing the subject matter of any one of Examples 32 to 38

Example 42 is a system including: a peripheral device, a memory to store original code and optimized code, and a processor coupled to the memory, where the processor includes a register file comprising a plurality of registers, where the processor is configured to execute a code generator, where the code generator is configured to optimize a portion of the original code to create the optimized code, create a partial commit point to indicate that execution of the optimized code produces an invalid architectural state, create recovery information to recover a valid architectural state at a recovery point, and associate the partial commit point and recovery information with the optimized code.

Example 43 is a system including a peripheral device, a memory to store code, and a processor coupled to the memory, where the processor includes a register file comprising a plurality of registers, wherein the processor is configured to identify a recovery point after execution of the code, wherein the code is associated with a partial commit point, the partial commit point to indicate an invalid architectural state, and update the architectural state using recovery information associated with the partial commit point.

Example 44 is an apparatus, including means for optimizing a portion of original code to create optimized code, means for creating a partial commit point to indicate that execution of the optimized code produces an invalid architectural state, means for creating recovery information to recover a valid architectural state at a recovery point, and means for associating the partial commit point and recovery information with the optimized code.

Example 45 is an apparatus, including means for identifying a recovery point after execution of code, wherein the code is associated with a partial commit point, the partial commit point to indicate an invalid architectural state, and means for updating the architectural state using recovery information associated with the partial commit point.

Example 46 is a non-transitory, computer-readable storage medium including instructions that, when executed by a processor, cause the processor to perform operations including optimizing a portion of original code to create optimized code, creating a partial commit point to indicate that execution of the optimized code produces an invalid architectural state, creating recovery information to recover a valid architectural state at a recovery point, and associating the partial commit point and recovery information with the optimized code.

Example 47 is a non-transitory, computer-readable storage medium including instructions that, when executed by a processor, cause the processor to perform operations including identifying a recovery point after execution of code, where the code is associated with a partial commit point, the partial commit point to indicate an invalid architectural state, and updating the architectural state using recovery information associated with the partial commit point.

Example 48 is a system including a peripheral device, a memory to store original code and optimized code, and a processor coupled to the memory, where the processor includes a register file comprising a plurality of registers, where the processor is configured to execute a code generator, where the code generator is configured to optimize a portion of the original code to create the optimized code, create a partial commit point to indicate that execution of the optimized code produces an invalid architectural state, create recovery information to recover a valid architectural state at a recovery point, and associate the partial commit point and recovery information with the optimized code.

Example 49 is a system including: a peripheral device, a memory to store code, and a processor coupled to the memory, where the processor includes a register file comprising a plurality of registers, where the processor is configured to identify a recovery point after execution of the code, where the code is associated with a partial commit point, the partial commit point to indicate an invalid architectural state, and update the architectural state using recovery information associated with the partial commit point.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," "optimizing," "creating," "associating," "removing," "consolidating," "combining," "detecting," "identifying," "profiling," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An apparatus, comprising:
   a memory to store original code and optimized code; and
   a processor coupled to the memory, wherein the processor is configured to execute a code generator, wherein the code generator is configured to:
      optimize a portion of the original code to create the optimized code;
      create a partial commit point to indicate that execution of the optimized code produces an invalid architectural state;
      create recovery information to recover a valid architectural state at a recovery point; and
      associate the partial commit point and recovery information with the optimized code.

2. The apparatus of claim 1, wherein the optimized code is executed in a processor that comprises a register file comprising a plurality of registers, wherein the invalid architectural state comprises an incorrect value in one or more of the plurality of registers or a plurality of memory positions, wherein the recovery information comprises recovery code that, when executed, is configured to recover at least one correct value for the at least one of the plurality of registers or the plurality of memory positions in response to the recovery point.

3. The apparatus of claim 1, wherein when the code generator optimizes the portion of the original code, the code generator to perform at least one of: remove one or more instructions in the original code, combine a plurality of instructions in the original code into one instruction, or apply an optimization that leads to an invalid architectural state.

4. The apparatus of claim 3, wherein the optimized code comprises a plurality of code regions, each of which comprises at least one entry point and at least one exit point, wherein the code generator is further configured to:
   optimize code of at least one of the plurality of code regions;
   create at least one partial commit point for the at least one of the plurality of code regions; and
   associate the partial commit point with an exit point of the at least one of the plurality of code regions.

5. The apparatus of claim 1, wherein the code generator is further configured to store the recovery information in the memory.

6. The apparatus of claim 1, wherein the recovery information comprises a partial commit marker and recovery code, wherein the partial commit marker to identify a next partial commit, wherein at least one of the processor or a second processor is to execute the recovery code to recover a correct value for the valid architecture state.

7. The apparatus of claim 6, wherein the recovery information comprises an address to locate the recovery code.

8. The apparatus of claim 1, wherein the recovery point is associated with at least one of an interrupt or an exception.

9. The apparatus of claim 1, wherein the processor is further configured to: execute the optimized code;
   detect the recovery point after execution of the optimized code; and
   using the recovery information, obtain at least one correct value for the at least one of a plurality of registers that comprise an incorrect value.

10. The apparatus of claim 3, wherein the code generator is further configured to:
    identify a region of the optimized code; and
    profile the identified region of the optimized code to determine a use characteristic of the identified region of the optimized code.

11. The apparatus of claim 10, wherein the use characteristic of the identified region of code comprises at least one of: a number of times the identified region of optimized code is executed over a period of time, a value generated by executing the identified region of optimized code, or a comparison of the identified region of optimized code with another region of optimized code identified by the processor.

12. The apparatus of claim 11, wherein the code generator is to speculatively optimize the original code based on the use characteristic.

13. An apparatus, comprising:
    a memory to store code; and
    a processor coupled to the memory, wherein the processor comprises a register file comprising a plurality of registers, wherein the processor is configured to:
        identify a recovery point after execution of the code, wherein the code is associated with a partial commit point, the partial commit point to indicate an invalid architectural state; and
        update the architectural state using recovery information associated with the partial commit point.

14. The apparatus of claim 13, wherein the memory comprises a plurality of memory positions, wherein the invalid architectural state comprises an incorrect value in one or more of the plurality of registers or the plurality of memory positions, wherein the recovery information is to recover at least one correct value for the at least one of the plurality of registers or the plurality of memory positions in response to the recovery point.

15. The apparatus of claim 13, wherein the memory is configured to store the recovery information.

16. The apparatus of claim 13, wherein the recovery information comprises recovery code that causes the processor to generate a valid value to update the architectural state.

17. The apparatus of claim 13, wherein when identifying the recovery point, the processor is configured to:
    identify whether a commit point was partial commit point; and
    identify the recovery information when the commit point is a partial commit point.

18. The apparatus of claim 13, wherein when updating the architectural state using recovery information associated with the partial commit point, the processor is to:
    identify, using the recovery information, additional code that is not part of an optimized portion of the code;
    execute the identified code to generate a correct value for at least one of the plurality of registers; and
    write the correct value to the least one of the plurality of registers.

19. A method, comprising:
    identifying original code for optimization;
    optimizing a portion of the original code to create optimized code;
    creating a partial commit point to indicate that execution of the optimized code produces an invalid architectural state;
    creating recovery information to recover a valid architectural state at a recovery point; and
    associating the partial commit point and recovery information with the optimized code.

20. The method of claim 19 further comprising:
    detecting the recovery point after execution of the optimized code; and
    using the recovery information, obtaining at least one correct value for the valid architectural state.

21. The method of claim 20, wherein the recovery information comprises recovery code, wherein a processor is to execute the recovery code to recover a correct value for at least one of a register or a memory position.

22. The method of claim 20, wherein obtaining at least one correct value for the valid architectural state comprises:
    using the recovery information, identifying a region of code that is not part of the optimized code;
    executing the identified region of code to generate a correct value for at least one of a register or a memory position; and
    writing the correct value to the least one register or memory position.

23. The method of claim 19, wherein the code comprises a plurality of code regions, each of which comprises at least one entry point and at least one exit point, further comprising:

optimizing code of at least one of the plurality of code regions;

creating at least one partial commit point for the at least one of the plurality of code regions; and associating the partial commit point with an exit point of the at least one of a plurality of code regions.

24. A non-transitory, computer-readable storage medium including instructions that, when executed by a processor, cause the processor to perform operations comprising:

identifying original code for optimization; optimizing a portion of the original code to create optimized code;

creating a partial commit point to indicate that execution of the optimized code produces an invalid architectural state;

creating recovery information to recover a valid architectural state at a recovery point; and associating the partial commit point and recovery information with the optimized code.

25. The non-transitory, computer-readable storage medium of claim 24, wherein the recovery information comprises recovery code, wherein at least one of the processor or a second processor is to execute the recovery code to recover a correct value for at least one register or memory position.

\* \* \* \* \*